MONOSTABLE MULTIVIBRATOR UTILIZING COMMON-BASE TRANSISTOR TO PROVIDE ISOLATION BETWEEN TIMING NETWORK AND SWITCHING TRANSISTOR

Filed Jan. 7, 1963

INVENTOR
S. F. SAMPSON
BY Roy M. Porter Jr.
ATTORNEY

United States Patent Office 3,191,069

Patented June 22, 1965

3,191,069
MONOSTABLE MULTIVIBRATOR UTILIZING COMMON-BASE TRANSISTOR TO PROVIDE ISOLATION BETWEEN TIMING NETWORK AND SWITCHING TRANSISTOR

Sidney F. Sampson, Lincroft, N.J., assignor to Bell Telephone Laboratories, Incorporated, New York, N.Y., a corporation of New York Filed Jan. 7, 1963, Ser. No. 249,900
5 Claims. (Cl. 307—88.5)

Figures 1, 3:
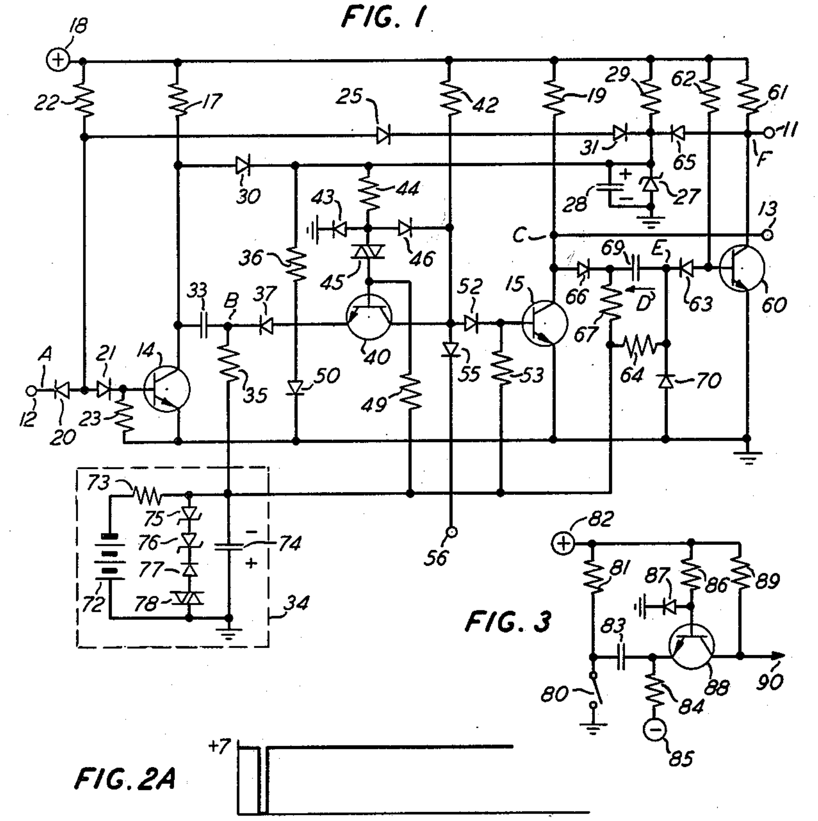

The present invention relates to multistate devices and, more particularly, to a relaxation circuit for generating accurately timed waveforms.

Digital information-handling techniques are applicable to a variety of relatively new fields. Among these are digital computers, pulse communications, data-processing, control systems, telephone switching systems, and telemetering. Since these arrangements perform high-speed sequential operations, timing and synchronization are of prime importance. Accurately determined time-intervals must accordingly be established and, for this purpose, some form of timed multistate device is often employed. In general, such a device includes a reactive (R–C or R–L) network and a comparator. To begin the timing, a potential is applied to the reactive time-reference network to develop a signal having a monotonically changing magnitude. When this signal reaches a predetermined threshold level, the comparator indicates the termination of the time-interval.

Transistorized monostable or astable multivibrators are exemplary of such devices and are widely used for performing the desired timing functions in digital systems. In the multivibrator, a pair of transistor switches are cross-connected such that one is actuated at the end of a predetermined delay time following the actuation of the other. The duration of this delay time-interval is determined by a variety of factors, including the component values in the cross-connecting circuitry, the magnitude of the supplied voltages, the parameters of the switching transistors, and the magnitude of the threshold level. Since all of these factors may be subject to variation, particularly where the multivibrator is to be operated for an extended period of time or in an environment of changing temperature, establishing a time-interval with the precision required by some applications is quite difficult.

Accordingly, it is an object of the present invention to derive electrical timing signals with increased accuracy.

It is a further and related object of the present invention to generate a precisely timed electrical waveform.

More particularly, it is an object of the present invention to interconnect the switching transistors in a multivibrator circuit such that the circuit delivers an accurately timed output waveshape.

A still further object of the present invention is to generate a timed waveform by means of a transistorized multistate device having reduced sensitivity to variations in supply voltages, operating temperatures, and transistor parameters.

In a principal aspect, the present invention takes the form of a first and a second transistor switch and novel means for interconnecting these switches to form a multistate device. In accordance with a first feature of the invention, the circuitry interconnecting the switches includes a third transistor connected in a common-base configuration. The emitter electrode of this third transistor is connected to a capacitive timing network. In accordance with the invention, the common-base transistor operates as a threshold device, being turned ON whenever the voltage applied to its emitter electrode is sufficient to forward-bias the base-emitter junction. Still another feature of the invention resides in the use of the common-base transistor to provide isolation between the timing network and the second transistor, thereby minimizing any adverse effect upon the timing function due to changing parameters in the second transistor. According to another feature of the invention, the aforementioned first and third transistors are employed to clamp both sides of the timing network capacitor to accurately determined reference voltages thereby presetting the initial charge on the timing capacitor at a precise value. Furthermore, all critical operating potentials provided in accordance with the invention are obtained from temperature compensated regulated sources.

These and other objects, features and advantages of the present invention will become more apparent following a consideration of the following detailed description and drawings. In the drawings:

FIG. 1 schematically illustrates a detailed embodiment of the present invention;

FIGS. 2A–2F show waveforms which appear at various points throughout the circuit of FIG. 1; and FIG. 3 shows, for purposes of illustration, a simplified embodiment of the novel cross-connecting scheme contemplated by the present invention.

The embodiment of the invention shown in FIG. 1 of the drawings is a delayed pulse generator which delivers an output pulse to terminal 11. This pulse appears at the end of a precise delay period following the application of an initiating input pulse to input terminal 12. During the aforementioned delay period, a second output terminal 13 is connected to ground. Briefly, the arrangement shown in FIG. 1 comprises a monostable multivibrator circuit driving an output pulse generator. The multivibrator circuit determines the length of the delay period while the pulse generator determines the duration of the output pulse which appears at terminal 12.

The multivibrator portion of the circuit shown in FIG. 1 includes a pair of switching transistors 14 and 15. The emitter electrode of transistor 14 is grounded and its collector electrode is connected by means of a collector resistance 17 to a positive supply voltage terminal 18. Similarly, the emitter electrode of transistor 15 is grounded and its collector electrode is connected to the positive supply terminal 18 by means of collector resistance 19.

The transistor 14 is supplied with a "low-level-logic" input circuit comprising a pair of back-to-back diodes 20 and 21 which are connected in series between the input terminal 12 and the base electrode of transistor 14. The junction of diodes 20 and 21 is connected to the positive supply terminal 18 by means of a resistance 22. Resistance 23 connects the base electrode of transistor 14 to its grounded emitter electrode. A "latching" diode 25 connects the junction of diodes 20 and 21 to the collector electrode of the second switching transistor 15.

The collector electrodes of the two switching transistors 14 and 15 are clamped to a source of a regulated positive potential. This regulated potential appears across the parallel combination of Zener diode 27 and filter capacitor 28. The anode of the reverse-biased Zener diode 27 is connected to ground and its cathode is connected to the positive supply terminal 18 by means of a resistance 29. The collector electrode of transistor 14 is clamped to the potential appearing across Zener diode 27 by means of the diode 30 while the collector of transistor 15 is connected to the Zener diode 27 by means of the clamping diode 31.

The circuitry employed for cross-connecting the two switching transistors 14 and 15 includes a timing capacitor 33. One side of the timing capacitor 33 is connected to the collector electrode of transistor 14 while the other side receives a negative potential from the regulated source 34 by means of a resistance 35. A circuit path comprising the series combination of a resistance 36 and a diode 37 is connected between the cathode of Zener diode 27 and the junction of capacitor 33 and resistance 35. The diode 37 is poled in a direction appropriate for allowing positive current to flow from the Zener diode 27 to the negative source 34.

The embodiment of the invention pictured in FIG. 1 includes within its multivibrator section a common base connected transistor 40. The emitter electrode of transistor 40 is connected to the junction of diode 37 and resistance 36 and its collector electrode is connected to the positive supply terminal 18 by means of the collector resistance 42. In the base circuit of transistor 40, a diode 43 is serially connected with a resistance 44 between the cathode of Zener diode 27 and ground. Diode 43 is poled to allow positive current flow from the Zener diode 27 to ground such that the voltage at the junction of diode 43 and resistance 44 is held at a potential equal to the forward voltage drop across diode 43. An anti-saturation network comprising a varistor 45 and a diode 46 is also connected to the transistor 40. The varistor 45 is connected between the anode of diode 43 and the base electrode of transistor 40, while the diode 46 is connected between the collector electrode of transistor 40 and the anode of diode 43. A resistance 49 is connected between the base electrode of transistor 40 and the negative source 34. A clamping diode 50 is connected between the emitter electrode of transistor 40 and ground.

The common-base transistor 40 is arranged to actuate the transistor switch 15. The two transistors 40 and 15 are interconnected by a circuit which comprises the diode 52 which is connected between the collector electrode of transistor 40 and the base electrode of transistor 15 and a resistance 53 which connects the base of transistor 15 to the negative supply source 34. An inhibit circuit is also included which comprises the diode 55 connected between the collector of transistor 40 and the inhibit input 56.

The second switching transistor 15 drives an output pulse generator which includes the switching transistor 60. The emitter electrode of transistor 60 is grounded and its collector electrode is connected to the positive supply terminal 18 by means of a collector resistance 61. Forward-biasing current is supplied to the base of transistor 60 from positive supply terminal 18 by means of resistance 62. A circuit path comprising the series connection of a diode 63 and a resistance 64 is connected between the base of transistor 60 and the negative voltage source 34. Similarly, the collector electrode of transistor 15 is connected to the voltage source 34 by means of the series combination of a diode 66 and a resistance 67. A timing capacitor 69 is connected between the junction of diode 66 and resistance 67 and the junction of diode 63 and resistance 64. A clamping diode 70 connects the junction of capacitor 69 and diode 63 to ground.

In the embodiment of the invention shown in FIG. 1 of the drawings, the negative voltage source 34 include a battery 72, the positive terminal of which is grounded. Resistance 73 and filter capacitor 74 are connected in series between the negative terminal of battery 72 and ground. A diode-stack comprising two Zener diodes 75 and 76, a forward-biased diode 77, and a varistor 78 is connected in parallel with the filter capacitor 74.

The explanation which follows will be considerably simplified by assigning specific values to the above-identified components so that reference may be made to specific voltage levels and time durations. It should be understood that considerable variation in these values is possible without changing the operation of the circuit and that they are by no means critical. Therefore the following circuit element values are given, by way of example, for the delayed pulse generator embodiment of the invention shown in FIG. 1:

| | |
|---|---|
| Transistor **14** | 29A–type NPN transistor. |
| Transistor **15** | 29A–type NPN transistor. |
| Resistance **17** | 619 ohms. |
| Supply voltage terminal **18** | Connect to low-impedance +19 volt source. |
| Resistance **19** | 619 ohms. |
| Diode **20** | 447A–type silicon diode. |
| Diode **21** | 449A–type "shifter" diode. |
| Resistance **22** | 8,160 ohms. |
| Resistance **23** | 4,700 ohms. |
| Diode **25** | 447A–type silicon diode. |
| Diode **27** | 446A–type Zener diode. |
| Capacitor **28** | 10 μf. |
| Resistor **29** | 2,700 ohms. |
| Diode **30** | 446A–type silicon diode. |
| Diode **31** | 446A–type silicon diode. |
| Capacitor **33** | 3,570 μf. |
| Resistance **35** | 1,650 ohms. |
| Resistance **36** | 10,000 ohms. |
| Diode **37** | 447A–type silicon diode. |
| Transistor **40** | 29A–type NPN transistor. |
| Resistance **42** | 8,160 ohms. |
| Diode **43** | 446A–type silicon diode. |
| Resistance **44** | 361 ohms. |
| Varistor **45** | 100A–type varistor. |
| Diode **46** | 447A–type silicon diode. |
| Resistance **49** | 15,000 ohms. |
| Diode **50** | 447A–type transistor. |
| Diode **52** | 449A–type "shifter" diode. |
| Resistance **53** | 82,000 ohms. |
| Diode **55** | 447A–type silicon diode. |
| Transistor **60** | 29A–type NPN transistor. |
| Resistance **61** | 3,300 ohms. |
| Resistance **62** | 10,000 ohms. |
| Diode **63** | 447A–type silicon diode. |
| Resistance **64** | 4,700 ohms. |
| Diode **66** | 447A–type silicon diode. |
| Resistance **67** | 2,000 ohms. |
| Capacitor **69** | 200 μf. |
| Diode **70** | 447A–type silicon diode. |
| Battery **72** | Low-impedance −40 volt source. |
| Resistance **73** | 681 ohms. |
| Capacitor **74** | 10 μf. |
| Diode **75** | 446B–type Zener diode. |
| Diode **76** | 446B–type Zener diode. |
| Diode **77** | 449A–type "shifter" diode. |
| Varistor **78** | 100A–type varistor. |

For the above values, the delayed pulse generator provides a 0.5 microsecond negative-going pulse at terminal 11 after the delay from the leading edge of the input pulse applied to input terminal 12. The duration of the delay time will be equal to 2.4 microseconds.

Before attempting to understand what occurs within the circuit shown in FIG. 1 when an input pulse is applied to terminal 12, it will be helpful to obtain a familiarity with the various voltage levels which exist at different points throughout the circuit in the steady state condition. Since the mode of operation of the invention may be more accurately described on a quantitative basis, actual numerical values will be used to express the voltage levels. These numerical values will be representative of voltage magnitudes appearing in the circuit of FIG. 1 when those element values as listed in the table above are used.

Before an input pulse is applied, transistors 14 and 40 are in a conducting ON condition while transistors 15 and 60 are turned OFF. Transistor 14 is held ON by the forward-biasing base current supplied through resistance 22 and diode 21. While transistor 14 is conducting, its collector potential is equal to +0.5 volt.

The positive potential appearing across Zener diode 27 causes a current to flow through resistance 44, forward-biasing diode 43. The voltage at the cathode of diode 43 is hence equal to +0.7 volt. The transistor 40 is provided with an "anti-saturation" network comprising diode 46 and varistor 45, both of which are initially conducting. Due to the drop across these forward-conducting devices which are assumed to be approximately equal, the potential at both the base and collector of transistor Q2 is substantially equal to zero volt. The emitter current flowing through diode 37 and resistance 35 to the negative potential supplied from negative source 34 causes voltage drops of 0.7 volt across both the base-emitter junction of transistor 40 and the forward-biased diode 37. Thus, the voltage at the emitter of transistor 40 is equal to −0.7 volt and the voltage at the right-hand side of capacitor 33 is equal to −1.4 volts. The initial voltage across capacitor 33 is thus accurately determined by the two ON transistors 14 and 40, the first holding the left-hand side of capacitor 33 at +0.5 volt and the second holding the right-hand side at −1.4 volts.

Since the zero potential at the collector of transistor 40 is insufficient to forward-biased diode 52, transistor 15 is normally nonconducting. The voltage at its collector is equal to +6.7 volts as determined by the 6-volt Zener reference diode 27 and the 0.7-volt drop across the clamping diode 31. The +6.7-volt potential at the collector of transistor 15 forward-biases diode 66 and current flows through resistance 67 to the negative potential source 34. Thus, the potential on the left-hand side of capacitor 69 is initially equal to +6.0 volts. Positive current also flows through resistance 62, the forward-biased diode 63, and resistance 64 to the negative source 34. Due to the voltage-divider action of resistance 62 and 64, the voltage on the right-hand side of capacitor 69 would normally be several volts negative. However, the forward-biased diode 70 clamps the right-hand side of capacitor 69 to a potential of −0.7 volt. This negative potential insures that diode 63 will conduct, thereby shunting forward-biasing base current away from transistor 60. Transistor 60 being turned OFF, the potential at its collector is clamped to +6.7 volts by the combined action of Zener diode 27 and the forward-biased clamping diode 65.

The delayed pulse generator shown in FIG. 1 of the drawings is actuated by a negative-going pulse which is applied to the input terminal 12. This negative-going pulse momentarily forward-biases diode 20 and removes the "turn-on" current from transistor 14. It should be noted that the diode 21 is a so-called "shifter" diode which exhibits a forward voltage drop of approximately two volts. The drop across the conventional diode 20, being only 0.7 volt, allows the transistor 14 to be turned OFF by momentarily grounding the input terminal 12. When transistor 14 is turned OFF, the cross-connecting circuitry which includes the transistor 40, causes the transistor 15 to turn ON. As soon as transistor 15 becomes conductive, the latching diode 25 is also forward-biased, thereby holding transistor 14 OFF even after the initiating pulse is removed from input 12.

In order to more clearly understand the operation of the cross-connecting circuitry between transistors 14 and 15, it will be helpful to consider the simplified cross-connecting circuitry shown in FIG. 3 of the drawings. In FIG. 3 a switch 80 is connected in series with a resistance 81 between the positive supply voltage terminal 82 and ground. A capacitor 83 and a resistance 84 are connected between the juncture of switch 80 and resistance 81 and a negative supply terminal 85. A circuit path including the series connection of resistance 86 and diode 87 is connected between the positive supply terminal 82 and ground, the diode 87 being poled such that forward-biasing current is allowed to flow through the resistance 86. The potential at the cathode of diode 87 is thus clamped to a voltage +0.7 volt. The emitter electrode of a transistor 88 is connected to the juncture of the capacitor 83 and resistance 84, while its base electrode is connected to the cathode of diode 87. The collector of transistor 88 is connected to the positive supply terminal 82 by means of a collector resistance 89. A circuit connection through the collector of transistor 88 forms the output 90 of the cross-connecting circuitry.

The switch 80 represents the transistor 14 in FIG. 1 and is normally closed. During this time, the left-hand side of the timing capacitor 83 is connected to ground. The transistor 88 is conducting and the voltage at the right-hand side of capacitor 83 is also equal to zero volt since the drop across the base-emitter junction of transistor 88 compensates for the drop across the clamping diode 87. Thus, the initial charge on capacitor 83 is accurately set to approximately zero volt.

As soon as the switch 80 is opened, the right-hand side of capacitor 83 rises immediately to a positive potential turning OFF the transistor 88. The capacitor 83 then charges through a path comprising resistance 81 and 84 such that the voltage at the emitter of transistor 88 once again drops toward its original value. As soon as the emitter voltage reaches zero volt, the transistor 88 once again conducts. During the precise delay time in which transistor 88 was nonconductive, a positive voltage was delivered to output 90. This positive voltage is similar to that developed at the collector of transistor 40 in FIG. 1 which is appropriate for turning the normally OFF transistor ON during the delay period.

Figures 2A, 2B, 2C, 2D, 2E, 2F:
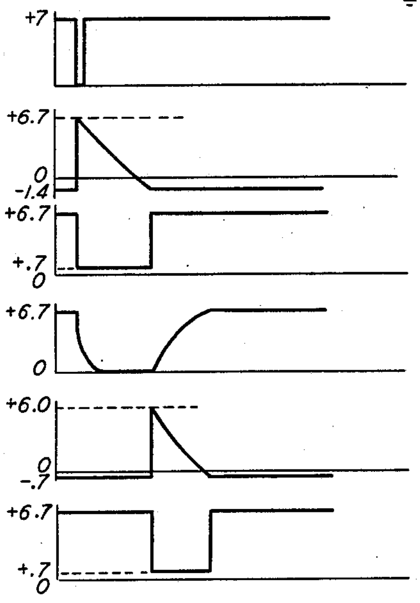

The operation of the more detailed cross-connecting circuitry shown in FIG. 1 of the drawings is essentially like that of the simplified circuitry pictured in FIG. 3. As discussed above, the transistor 14 is turned OFF whenever a negative-going pulse is applied to the input terminal 12. As soon as transistor 14 becomes nonconductive, its collector potential immediately rises to a value of +6.7 volts as determined by the 6-volt Zener reference diode 27 and the forward-biased clamping diode 30. The capacitor 33 cannot discharge instantaneously and the voltage applied to the cathode of diode 37 also immediately rises, turning OFF transistor 40. The "catching" diode 50 prevents unnecessary positive excursion of the voltage at the emitter of transistor 40 by holding it to a value of +0.7 volt. As mentioned above, as soon as transistor 14 turned OFF, its collector voltage was held at +6.7 volts. The negative reference source, which delivers a regulated negative potential of −15 volts, is applied to the other side of the charging path which includes the capacitor 33 and the resistance 35. Due to the application of this forcing potential, the capacitor 33 thus begins to charge with the voltage at point B (the right-hand side of capacitor 33) becoming increasingly negative. The waveform of voltage existing at point B is shown by FIG. 2B of the drawings. When the voltage at point B returns to its original value of −1.4 volts, the diode 37 and the base-emitter junction of transistor 40 again become forward-biased and the transistor 40 is turned ON. It should be noted that the length of time transistor 40 is turned OFF is determined by an accurate, regulated forcing potential and a charging rate having a time-constant equal to the product of capacitance of capacitor 33 and the resistance of resistor 35. Further, the threshold level is accurately predetermined by the clamped, common-base transistor 40.

As soon as transistor 40 is turned OFF, the potential at its collector rises, forward-biasing diode 52 and the base-emitter junction of the normally OFF transistor 15. During the time the transistor 15 conducts, the voltage at its collector falls to 0.7 volt as shown on FIG. 2C of the drawings.

A particular advantage of employing a common base stage as the threshold element may now be pointed out. Thus, the low input impedance of the common base stage permits a rapid shift of the current through resistor 35 from capacitor 33 into the base of transistor 15. This current coupled with the high voltage gain of the common base configuration heavily reverse pulses the base of transistor 15. The resultant heavy turnoff drive into the base of transistor 15 turns it off rapidly, thus accurately determining the desired time interval. If the common base stage were not used, transistor 15 would still turn off but much more slowly. The time required for the current to switch from charging capacitor 33 to flowing into the base of transistor 15 is approximately the impedance of capacitor 33 times the input impedance of threshold element. The input impedance of normal common emitter stages ranges from 200 ohms to greater than 1000 ohms, whereas that for common base stages range from 2 ohms to 20 ohms. Thus, the current source switching speed is improved from at best 0.6 microsecond to at least 0.06 microsecond, or more likely from greater than 1 microsecond to less than 20 nanoseconds. Such improvements greatly enhance the delay time accuracy of this circuit.

Whenever transistor 15 becomes conductive, the voltage at point E (the right-hand side of capacitor 69) goes negative and capacitor 69 is allowed to discharge, thus "arming" the capacitor. Then when transistor 15 is once more turned OFF, the +6.7 volts potential at the collector of transistor 15 is also applied at point E causing diode 63 to back-bias and allowing forward-biasing current to flow through the base-emitter junction of transistor 60. Transistor 15 being turned OFF, capacitor 69 again charges. The waveform of the voltage across capacitor 69 is shown on FIG. 2D. Eventually, when the potential at point E reaches zero volts, diode 63 is once again forward-biased and transistor 60 is turned OFF. The diode 70 prevents the voltage at the anode of diode 63 from falling below −0.7 volt and permits rapid recovery of capacitor 69.

It may thus be seen that transistor 60 conducts for a fixed period of time (about 0.5 microsecond with the element values given in the table above), thus delivering a negative-going output pulse to the output conductor 11 as shown in FIG. 2F of the drawings. The output conductor 13, being connected to the collector of transistor 15, is connected to ground during the delay interval between the application of the input pulse and the leading edge of the output pulse appearing at output 12 as shown in FIG. 2C.

Another feature of the delay pulse generator shown in FIG. 1 of the drawings involves a technique of temperature compensation for the reference voltage sources. It has been observed that the forward-voltage drop across a diode junction fluctuates with a temperature change. For a conventional silicon diode junction, this change is approximately −2 millivolts per degree centigrade. For a Zener diode, however, the reverse-biased voltage drop fluctuates at a +2 millivolts per degree centigrade. The so-called "shifter" diodes, being comprised of three silicon junctions, exhibit a temperature sensitivity of −6 millivolts per degree centigrade. Thus, in the negative reference supply 34, two Zener diodes 75 and 76 are serially connected with a forward-biased "shifter" diode 77 and a varistor 78. Since the varistor 78 displays a positive temperature coefficient of +2 millivolts per degree centigrade, the shifter diode 77 compensates for the sum of the temperature variations across the two Zener diodes and the varistor. The varistor 45 and the silicon diode 43, which are connected in the base circuit of the transistor 40, compensate for one another in a similar manner to hold the base potential of transistor 40 at a constant value regardless of temperature change. The 6 volt positive reference supply is also temperature compensated by Zener diode 27 working in combination with either diode 30, diode 31 or diode 65.

It is to be understood that the arrangements which have been described are illustrative of the principles of the invention. Numerous other arrangements may be devised by those skilled in the art without departing from the true spirit and scope of the invention.

What is claimed is:

1. A multivibrator comprising, in combination, first and second switching transistors, each having a control electrode and a transconductive path, a source of an operating potential, first and second resistors for connecting the transconductive path of said first and second switching transistors respectively across said source, a capacitor having first and second terminals, circuit means for connecting the first terminal of said capacitor to the junction of said first resistor and the transconductive path of said first transistor, a source of a first reference potential, a resistive circuit path for connecting the second terminal of said capacitor to said source of said first reference potential, a third transistor having a control current path and a transconductive path, a source of a second reference potential, said control current path of said third transistor being connected between said second terminal and said source of said second reference potential, and means responsive to changes in the conductivity of the transconductive path of said third transistor for applying an actuating potential to the control electrode of said second switching transistor.

2. A multivibrator as set forth in claim 1 including diode clamping means for holding the voltage at said first terminal of said capacitor at a predetermined potential whenever the transconductive path of said first switching transistor is substantially nonconducting.

3. A multivibrator as set forth in claim 1 wherein said source of said second reference potential comprises a supply voltage source, a ground connection, and a conductive diode device connected between said ground connection and said supply voltage source, said second reference potential appearing across said diode.

4. A multivibrator as set forth in claim 1 wherein both said source of said first reference potential and said source of said second reference potential include at least two diodes effectively connected in series, said diodes having substantially equal and opposite temperature coefficients.

5. A multivibrator as set forth in claim 1 which includes, in combination, a source of forward-bias for said first transistor, a resistance and a diode connected between said last-named source and the control electrode of said first transistor, an input terminal, and a second diode connected between said input terminal and the junction of said resistance and said first diode.

References Cited by the Examiner

UNITED STATES PATENTS

| | | | |
|---|---|---|---|
| 2,827,574 | 3/58 | Schneider | 307—88.5 |
| 2,849,626 | 8/58 | Klapp | 307—88.5 |
| 3,126,489 | 3/64 | Dill | 307—88.5 |

ARTHUR GAUSS, *Primary Examiner.*